(12) United States Patent
Bhave et al.

(10) Patent No.: US 9,968,887 B2
(45) Date of Patent: May 15, 2018

(54) MEMBRANE ASSISTED SOLVENT EXTRACTION FOR RARE EARTH ELEMENT RECOVERY

(71) Applicant: UT-Battelle, LLC, Oak Ridge, TN (US)

(72) Inventors: Ramesh R. Bhave, Knoxville, TN (US); Daejin Kim, Knoxville, TN (US); Eric S. Peterson, Idaho Falls, ID (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 390 days.

(21) Appl. No.: 14/724,985

(22) Filed: May 29, 2015

(65) Prior Publication Data

US 2016/0346736 A1 Dec. 1, 2016

(51) Int. Cl.
| | | |
|---|---|---|
| B01D 61/00 | (2006.01) | |
| B01D 61/24 | (2006.01) | |
| C22B 59/00 | (2006.01) | |
| C22B 7/00 | (2006.01) | |
| B01D 69/08 | (2006.01) | |
| C22B 3/26 | (2006.01) | |
| B01D 71/26 | (2006.01) | |

(52) U.S. Cl.
CPC .......... B01D 61/246 (2013.01); B01D 69/08 (2013.01); B01D 69/081 (2013.01); C22B 3/0005 (2013.01); C22B 7/006 (2013.01); C22B 59/00 (2013.01); B01D 71/26 (2013.01); B01D 2325/12 (2013.01); Y02P 10/234 (2015.11)

(58) Field of Classification Search
CPC ....... C22B 59/00; C22B 7/006; C22B 3/0005; Y02P 10/234; B01D 61/246; B01D 69/08–69/088
USPC .......................................... 423/21.5; 210/635
See application file for complete search history.

(56) References Cited

U.S. PATENT DOCUMENTS

| | | | |
|---|---|---|---|
| 3,957,504 A * | 5/1976 | Ho | B01D 61/246 205/581 |
| 4,051,230 A | 9/1977 | Miyauchi | |
| 5,192,443 A | 3/1993 | Delloye et al. | |
| 6,291,705 B1 | 9/2001 | Ho et al. | |
| 6,350,419 B1 | 2/2002 | Ho | |
| 6,521,117 B2 | 2/2003 | Kocherginsky et al. | |
| 8,999,168 B2 | 4/2015 | Bhave et al. | |
| 2010/0224030 A1 | 9/2010 | Liu et al. | |
| 2012/0103900 A1 | 5/2012 | Shave et al. | |
| 2013/0259776 A1 | 10/2013 | Heres et al. | |

FOREIGN PATENT DOCUMENTS

| | | |
|---|---|---|
| CN | 103397212 | 12/2014 |
| EP | 2 537 576 | 12/2012 |
| KR | 10-2009-0094528 | 9/2009 |
| WO | 2012-168915 | * 12/2012 |

OTHER PUBLICATIONS

Nakayama, et al., "Separation of rare earth metals . . . with DTPA" J. Alloys Compounds, 225, 288-90, 1995.*
Juang, et al., "Analysis of the transport rates . . . liquid membrane" J. Membrane Sci. 110, 13-23, 1996.*
Yaftian et al., "Rare earth metal ion . . . calix[4]arene" J. Membrane Sci. 144, 57-64, 1998.*
International Search Report and Written Opinion of PCT/US16/28223, dated Aug. 30, 2016.
Juang, Ruey-Shin et al., "Recovery of nickel from a simulated electroplating rinse solution by solvent extraction and liquid surfactant membrane", Journal of Membrane Science, 1995, pp. 163-170.

* cited by examiner

Primary Examiner — Steven J Bos
(74) Attorney, Agent, or Firm — Warner Norcross & Judd LLP

(57) ABSTRACT

Systems and methods for the recovery of rare earth elements are provided. The systems and methods generally include membrane assisted solvent extraction using permeable hollow fibers having an immobilized organic phase within the pores of the hollow fibers. The permeable hollow fibers are generally in contact with an acidic aqueous feed on one side thereof and a strip solution on another side thereof. The systems and methods generally include the simultaneous extraction and stripping of rare earth elements as a continuous recovery process that is well suited for post-consumer products, end-of-life products, and other recovery sources of rare earth elements.

11 Claims, 7 Drawing Sheets

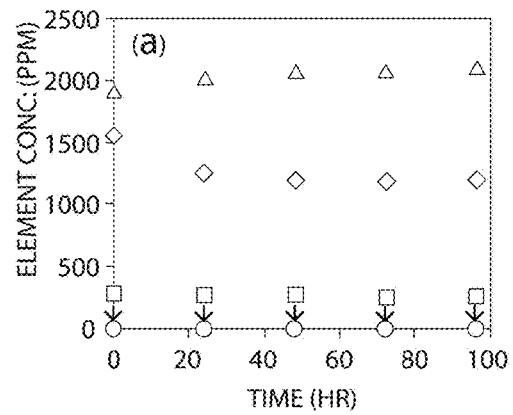
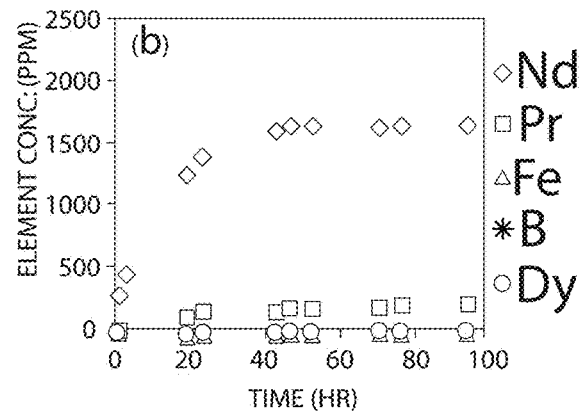
Fig. 7
Fig. 8
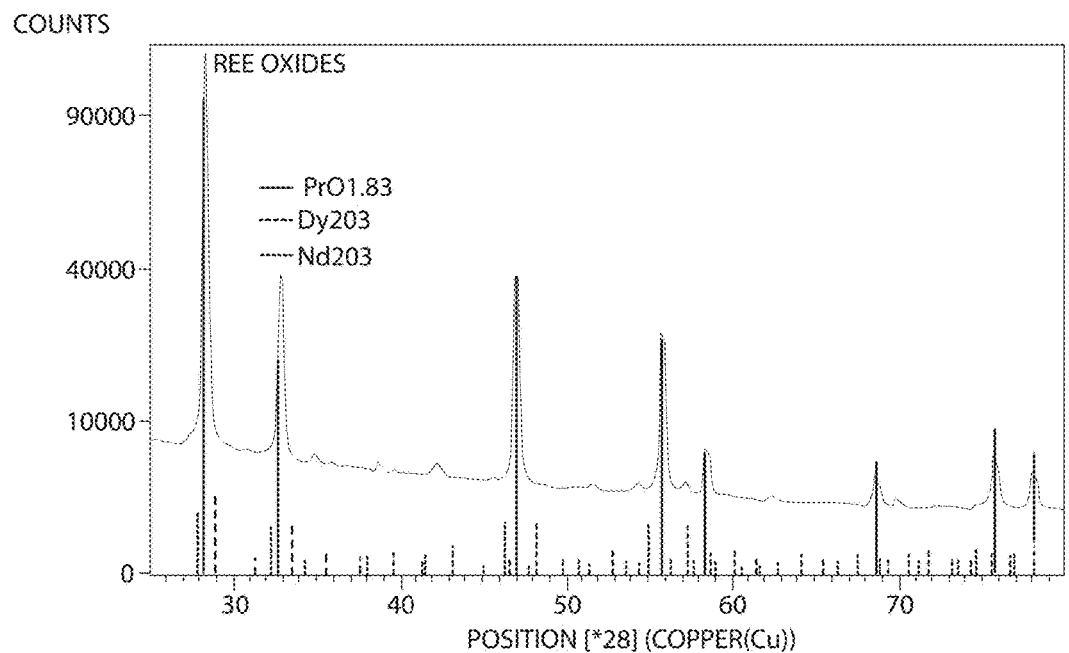
Fig. 9

MEMBRANE ASSISTED SOLVENT EXTRACTION FOR RARE EARTH ELEMENT RECOVERY

This invention was made with government support under Contract No. DE-AC05-00OR22725 awarded by the U.S. Department of Energy. The government has certain rights in the invention.

BACKGROUND OF THE INVENTION

The present invention relates to methods for recovering rare earth elements, and in particular, membrane assisted solvent extraction for the recovery of rare earth elements from post-consumer products and other end-of-life products.

Rare earth elements play an increasing role in the development of green energy and in high-tech industries. For example, the demand for rare earth elements has grown in response to an increased use of permanent magnets for electric motors, rechargeable batteries for hybrid electric vehicles, catalysts for petroleum refining, phosphors in flat panel displays, and generators for wind turbines.

Rare earth elements include a group of fifteen lanthanide elements along with scandium and yttrium. Currently, post-consumer products that include rare earth elements include the following: 1) permanent NdFeB magnets (neodymium (Nd), dysprosium (Dy), praseodymium (Pr)) in automobiles, mobile phones, hard disk drives, computers, consumer electronic devices, industrial electric motors, hybrid electric vehicles; 2) phosphors (europium (Eu), terbium (Tb), yttrium (Y)) in fluorescent lamps, LEDs, LCD backlights, plasma screens, cathode-ray tubes; and 3) nickel metal hydride batteries (lanthanum (La), cerium (Ce), Nd, Pr) in rechargeable batteries and in hybrid electric vehicle batteries. However, less than 1% of these rare earth elements are being recycled due to low efficiencies in existing recovery processes.

Currently recovery processes for rare earth elements include hydrometallurgy, pyrometallurgy, gas-phase extraction, and solvent extraction. Among these processes, hydrometallurgy is the most commonly used recovery process for permanent magnets. For example, permanent magnets can be dissolved in strong acids such as sulfuric acid, hydrochloric acid, phosphoric acid, and nitric acid, and the rare earth elements can be selectively precipitated as double sulfates, oxalates, and fluorides. The major challenges of hydrometallurgical processes, however, are high chemical usage, low selectivity due to co-extraction of non-rare earth elements, and generation of large amounts of waste. The rare earth elements can also be recovered by pyrometallurgical processes involving re-melting or liquid metal extraction from transition metals in the metallic state. However, this process creates slag formation and loss of a large amount of rare earth elements due to the carbon and oxygen contents in the scraps. In addition, pyrometallurgical processes require further separation for the recovered mixture of rare earth elements and high investment cost for high temperature furnaces.

Gas-phase extraction, as noted above, has also been proposed for the recovery of rare earth elements. Gas-phase extraction involves the separation of rare earth elements based on volatility differences, involving chlorination and carbochlorination with $Cl_2$ and CO in a $N_2$ stream. However, this process generates highly corrosive aluminum chloride with the formation of hydrogen chloride gas. Solvent extraction is another approach to recover rare earth elements by using the different solubilities of solutes in two immiscible liquids. For example, Pr and Nd were efficiently extracted via this process with 10% saponified Cyanex 272 (Bis(2,4,4-trimethylpentyl) phosphinic acid) and 0.5M TBP (tri butyl phosphate). In the conventional solvent extraction processes, however, separation is limited by the equilibrium of substances, requiring contact time enough for the dispersion of one phase in another immiscible phase. Additionally, this equilibrium-based separation process carries out extraction and stripping in two separate steps, and requires loading, flooding, third phase formation, and extractant loss as part of the overall recovery process.

Accordingly, there remains a need for an improved system and method for the recovery of rare earth elements. In particular, there remains a need for an improved system and method for the selective recovery of rare earth elements from post-consumer products and other end-of-life products while also reducing the environmental impact associated with existing rare earth element recovery processes. It is also desirable to recover rare earth elements in a highly pure form that is suitable for direct reuse or recycling with minimal or no post-processing.

SUMMARY OF THE INVENTION

A system and method for the recovery of rare earth elements are provided. The system and method include membrane assisted solvent extraction using an immobilized organic phase within the pores of permeable hollow fibers. The permeable hollow fibers are contacted by an aqueous feed solution on one side thereof, and a strip solution on another side thereof, to provide the simultaneous extraction and stripping of rare earth elements in a continuous recovery process that is well suited for post-consumer products, end-of-life products, and other sources of rare earth elements.

In one embodiment, the permeable hollow fibers are hydrophilic and oriented in a common direction between opposing tubesheets. The hollow fibers are generally selected to maximize the contact surface area per unit volume. For example, a bundle assembly can include several hundred fibers having an inner diameter of 0.25 mm, and outer diameter of 0.50 mm, and a pore size of 10 nm to 100 nm. Other dimensions may be used as desired. Each fiber includes a lumen side, a shell side, and an immobilized organic phase therebetween. The immobilized organic phase includes an extractant and a solvent. The extractant can include, for example, tetraoctyl diglycol amide, trialkyl phosphine oxide, 2-ethylhexyl phosphonic acid mono-2-ethylhexyl ester, carbamoyl phosphoryl oxides, or sec-octylphenoxy acetic acid. The organic solvent can include, for example, tributyl phosphate or an isoparaffin.

In another embodiment, the permeable hollow fibers also include hydrophilic fibers. According to this embodiment, the hydrophobic fibers provide a flow path for the feed solution, and the hydrophilic fibers provide a flow path for the strip solution. Extractant surrounds the fibers, offsetting the gradual loss of extractant, if any, into the strip solution. The hydrophobic fibers can be formed from polypropylene, polyethylene, or polyvinylidene fluoride, and the hydrophilic fibers can be formed from polyacrylonitrile, for example.

In another embodiment, the method includes directing an aqueous feed solution along one of the lumen side or the shell side of the plurality of hollow fibers, and directing a strip solution along the other of the lumen side or the shell side of the plurality of hollow fibers. The aqueous feed solution is pressurized with respect to the strip solution, and includes rare earth elements dissolved therein. The method can optionally include the addition of an extractant to the aqueous feed solution to offset any long term loss of extractant from the fiber pores. The method can further optionally include the recirculation of the feed solution to the fibers, and/or the arrangement of multiple fiber bundles in series or in parallel.

The system and method of the present invention can therefore facilitate the simultaneous extraction and stripping of rare earth elements from an aqueous feed solution using immobilized organic phase within the pores of hollow fibers. The system and method overcome removal limitations caused by equilibrium effects and can recover rare earth elements in a highly pure form, potentially obviating the need for further purification and processing. The application of membrane assisted solvent extraction can also achieve a more environmentally friendly and cost-effective process when compared to conventional techniques such as precipitation and solvent extraction.

These and other features and advantages of the present invention will become apparent from the following description of the invention, when viewed in accordance with the accompanying drawings and appended claims.

BRIEF DESCRIPTION OF THE DRAWINGS

FIG. 7 is a graph illustrating the concentration of elements in the feed solution over time in accordance with a first example.

FIG. 8 is a graph illustrating the concentration of elements in the strip solution over time in accordance with the first example.

FIG. 9 is an X-Ray Diffraction (XRD) analysis of rare earth element oxides from scrap magnets in accordance with the second example.

DETAILED DESCRIPTION OF THE CURRENT EMBODIMENTS

The invention as contemplated and disclosed herein includes systems and methods for the recovery of rare earth elements through membrane assisted solvent extraction. As set forth below, membrane assisted solvent extraction includes the simultaneous extraction and stripping of rare earth elements as part of a continuous and scalable recovery process with excellent selectively of rare earth elements.

Figure 1:
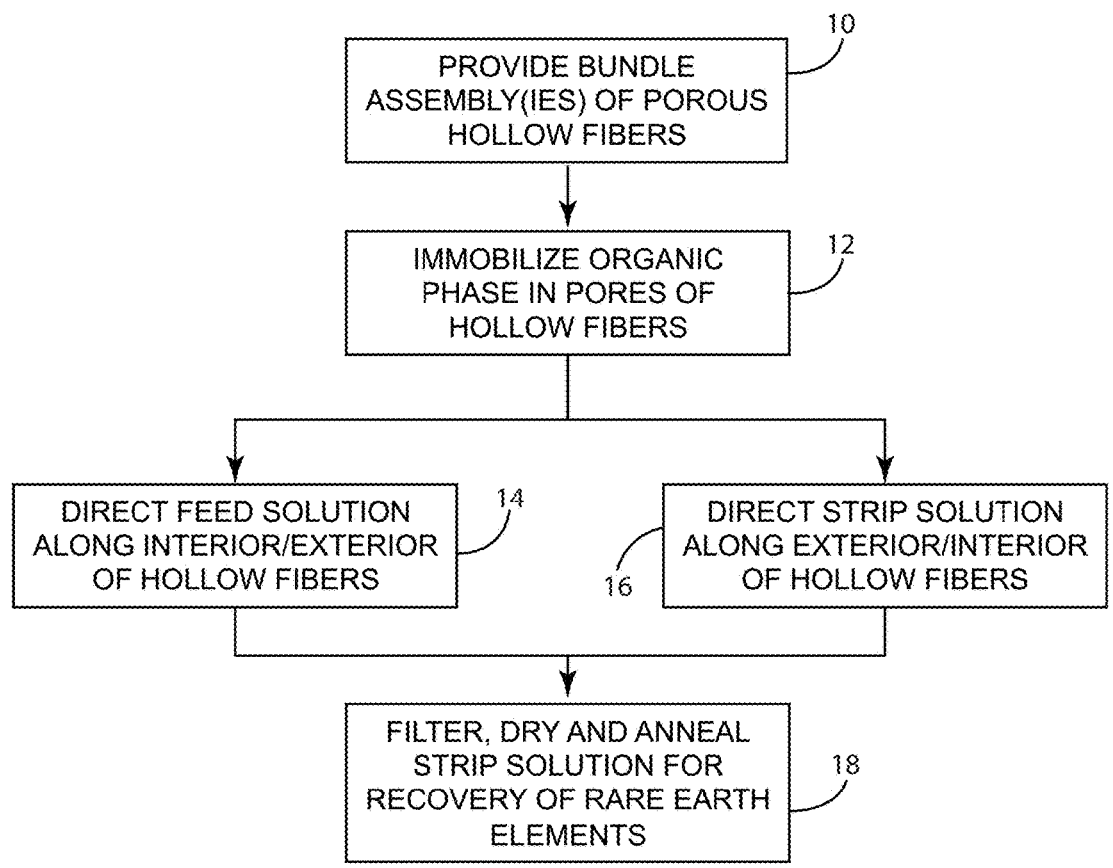
FIG. 1 is a flow diagram of membrane assisted solvent extraction in accordance with an embodiment of the invention.

Referring now to FIG. 1, a flow chart illustrating a method for membrane assisted solvent extraction in accordance with one embodiment is presented. In general terms, the method can include the following steps: a) providing a fiber bundle assembly including a plurality of permeable hollow fibers, b) wetting the plurality of permeable hollow fibers with an organic phase including an extractant and an organic solvent, c) applying a continuous flow rate of an acidic aqueous feed solution along the lumen side or the shell side of the plurality of permeable hollow fibers, the acidic aqueous feed solution including dissolved rare earth elements, d) applying a continuous flow rate of an acidic strip solution along the other of the lumen side or the shell side of the plurality of permeable hollow fibers, and e) filtering, drying and/or annealing the strip solution to recover highly pure rare earth elements. The steps of applying a feed solution at step c) and applying a strip solution at step d) are generally simultaneous to provide for the simultaneous extraction and stripping of rare earth elements. Each of these steps is discussed below.

Figure 2:
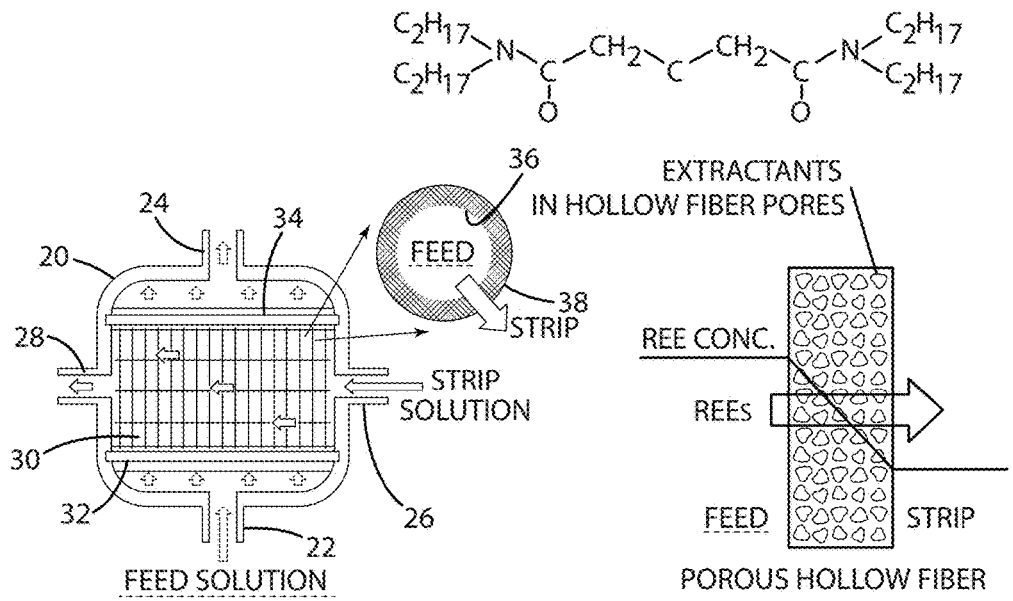
FIG. 2 is an illustration of a solvent extraction module including porous hollow fibers with an immobilized organic phase.

Providing a fiber bundle assembly is depicted as step 10 in FIG. 1. This step generally includes providing a plurality of hollow or tube-like fibers extending between opposing tubesheets. By way of illustration, a module containing a fiber bundle is illustrated in FIG. 2 and generally designated 20. The module 20 includes an outer casing including a feed input port 22, a feed output port 24, a strip input port 26, and a strip output port 28. The plurality of fibers 30 are potted to first and second tubesheets 32, 34 at opposing ends thereof, such that the fibers 30 extending in a common direction within the module 20. Each fiber 30 includes a lumen side 36 and a shell side 38. The lumen side 32 is illustrated in FIG. 2 as being exposed to the feed solution, however in other embodiments the lumen side 32 is exposed to the strip solution. Similarly, the shell side 34 is illustrated in FIG. 2 as being exposed to the strip solution, however in other embodiments the shell side 34 is exposed to the feed solution.

As used herein, the "lumen side" includes the interior surface that defines a channel extending longitudinally through the length of the hollow fiber, and the "shell side" includes the exterior surface of the fiber, such that the lumen side and the shell side are spaced apart from each other by the thickness of the membrane sidewall. The side in contact with the feed solution defines the "feed interface," and the side in contact with the strip solution defines the "strip interface." Consequently, the lumen side is the feed interface in some embodiments and is the strip interface in other embodiments. Similarly, the shell side is the strip interface in some embodiments and is the feed interface in other embodiments.

The fibers are generally selected to achieve a high contact surface area per unit volume, while also being porous to retain the organic phase therein and being formed of a material that is able to withstand the acidic conditions in the feed solution and, to a lesser extent, the strip solution. The fibers can include a mean inner diameter of between 0.1 mm and 1.0 mm inclusive, further optionally between 0.2 and 0.3 inclusive, and still further optionally about 0.25 mm. The fibers can include a mean outer diameter of between 0.1 mm and 1.0 mm inclusive, further optionally between 0.6 and 0.7 inclusive, and still further optionally about 0.5 mm. The fibers can have a mean membrane thickness of between 0.1 mm and 1.0 mm inclusive, further optionally between 0.2 and 0.3 inclusive, and still further optionally about 0.25 mm. The pore size can be selected such that the organic phase containing the extractant is not displaced by contact with a pressurized feed solution at pressures up to 30 psi (2 bar) higher than the pressure on the strip side of the fibers. That is, the pore size can be selected to have a sufficient bubble point pressure to retain the organic phase in place. This can ensure long-term stable operation (preventing extractant losses) even during process upsets than can sometimes occur at an industrial scale and to support the pressure losses within the system configuration. The fibers can include a mean pore size of less than 0.1 micron in some embodiments, while in other embodiments the mean pore size is between 0.01 micron and 0.1 micron inclusive, and in still other embodiments the mean pore size is between 0.1 micron and 1.0 micron inclusive. The fibers can be formed from a hydrophobic material, which assists in preventing the wetting of the fibers by the aqueous feed solution and which can also prevent the displacement of the organic phase into the strip solution. Hydrophobic materials can include, for example, polypropylene, polyethylene, polyvinylidene fluoride, polyether ether ketone, polysulfone, or polyethersulfone. In addition, inorganic materials, such as alumina, zeolite, titania, or silica may be used as supports, being adjacent to, or in contact with, the fibers. That is, the module 20 can include porous tubular/multi-channel inorganic membrane supports, provided the inorganic membrane supports are compatible with the extracting media. As discussed below in connection with FIG. 6, hydrophilic fibers can also be used in combination with hydrophobic fibers, optionally including polyacrylonitrile. Meltblown manufacturing techniques or extrusion manufacturing techniques can be used as desired.

Wetting the plurality of permeable fibers with an organic phase is depicted as step 12 in FIG. 1. This step results in an immobilized organic phase within the pores of the plurality of fibers. The immobilized organic phase can include an ionic liquid extractant and an organic solvent. The extractant can be selected for its ability to extract rare earth elements in the presence of non-rare earth elements. As one example, the extractant can be selected based on its ability to extract Nd from dissolved NdFeB magnets without also extracting non-rare earth elements such as Fe and B or transition metal coatings such as Cu and Ni. The extractant can be a neutral extractant, for example tetraoctyl diglycol amide ("TODGA") as shown in FIG. 2 or trialkyl phosphine oxides ("Cyanex 923"). Other extractants can be used in other embodiments as desired, including 2-ethylhexyl phosphonic acid mono-2-ethylhexyl ester, carbamoyl phosphoryl oxides, and sec-octylphenoxy acetic acid.

The immobilized organic phase also includes an organic solvent. The organic solvent is immiscible with very low solubility in aqueous solutions which minimizes extractant and solvent losses. The organic solvent includes tributyl phosphate ("TBP") in the present embodiment; however, alternative organic solvents can also be utilized, both in place of, and in addition to, TBP. For example, the organic solvent can include ISOPAR™ L (synthetic isoparaffinic solvent) by Exxon Mobil Corporation. Further by example, the organic solvent can include both TBP, ISOPAR™ L (synthetic isoparaffinic solvent), xylene, hexane, octanol, or kerosene. In one embodiment the immobilized organic phase included TODGA, ISOPAR™ L (synthetic isoparaffinic solvent), and TBP in the volume ratio of 3:4:3, respectively. Other immobilized organic phases can be used in other embodiments where desired.

Directing a continuous flow rate of an acidic aqueous feed solution along the lumen side or the shell side of the plurality of permeable fibers is depicted as step 14 in FIG. 1. This step generally includes providing an acidic aqueous feed solution including dissolved rare earth elements from post-consumer products, end-of-life products, and other sources of rare earth elements. The acidic aqueous feed solution can include $HNO_3$, HCl, or $H_2SO_4$, for example, at the desired molar concentration. Further by example, the aqueous feed solution can include 1-6 M $HNO_3$, and alternatively 3-6 M HCl. The feed solution can be directed through the module 20 along the lumen side 36 of each of the plurality of fibers 30 as shown in FIG. 2 above. Alternatively, the feed solution can be directed through the module 20 along the shell side 38 of each of the plurality of fibers 30.

Directing a continuous flow rate of an acidic aqueous strip solution along the lumen side or the shell side of the plurality of permeable fibers is depicted as step 16 in FIG. 1. This step generally includes providing a dilute strip solution to strip the rare earth elements complexes that have diffused from the feed interface to the strip interface. The dilute strip solution can include $HNO_3$, HCl, or $H_2SO_4$, for example, at a lower molar concentration than in the feed solution. That is, a concentration gradient and hence a chemical potential gradient are formed between feed solution and the strip solution. Further to facilitate recovery at the strip interface with minimal neutralization, the strip solution pH is selected to be as low as possible, optionally less than 0.5 M acid concentration. For example, the dilute strip solution can include 0.2 M $HNO_3$ in comparison to 6 M $HNO_3$ feed solution. The high affinity of the extractant for rare earth elements results in a high concentration rare-earth-element-extractant complex that can be easily transferred to the strip interface which has a lower rare earth element concentration. The strip solution can be directed through the module 20 along the shell side 38 of each of the plurality of fibers 30 as shown in FIG. 2 above, optionally in a direction generally transverse to the flow of the feed solution within the fibers 30. Alternatively, the strip solution can be directed through the interior of the hollow fibers 30 to contact the lumen side thereof. The method can also include the addition of an extractant, for example TODGA or Cyanex 923, to the feed solution to offset any long term loss of extractant from the fibers.

Figure 3:
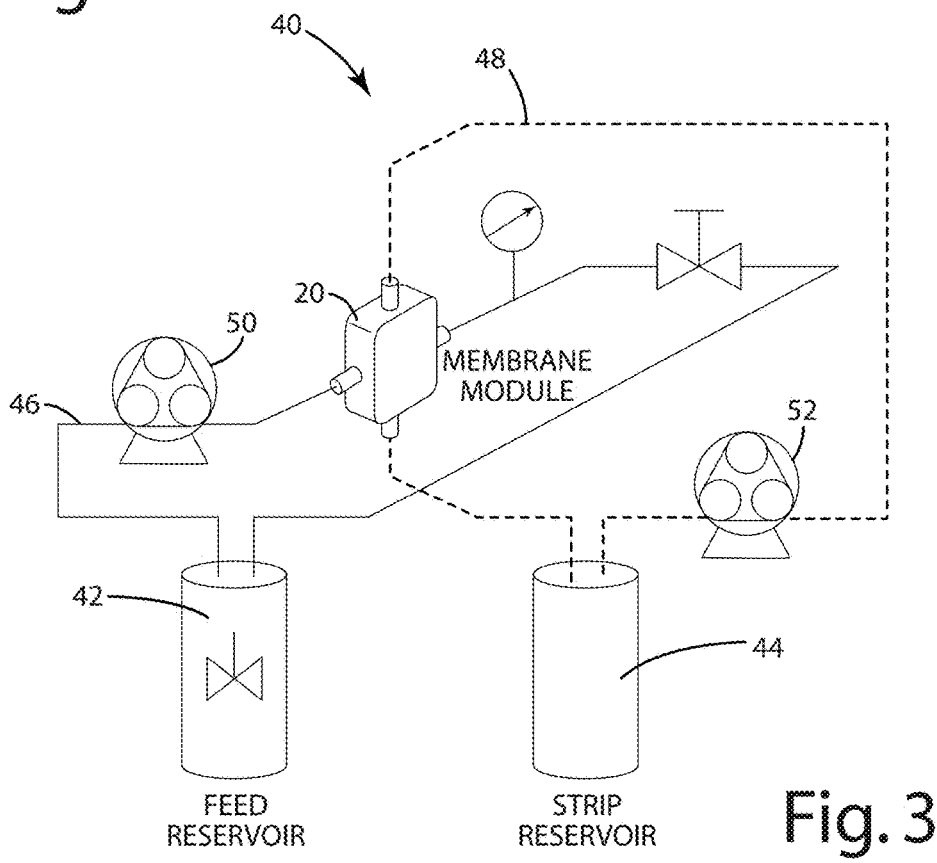
FIG. 3 is an illustration of a system for membrane assisted solvent extraction using the solvent extraction module of FIG. 2.

To further illustrate the circulation of the feed solution and the strip solution in steps 14 and 16, a system for membrane assisted solvent extraction is illustrated in FIG. 3 and generally designated 40. The system 40 includes a feed reservoir 42, a strip reservoir 44, a membrane assisted solvent extraction module 20, a feed line 46, and a strip line 48. The feed solution is contained within the feed reservoir 42 and mixed to ensure a uniform concentration. The feed line 46 includes a pump 50, for example a peristaltic pump, to ensure the feed line pressure is greater than the strip line pressure. In some applications the feed can be pressurized up to and including 30 psig, and optionally at least 5 psig depending in the properties of the supported membrane, while the strip can be maintained at atmospheric pressure. The strip line 48 also includes a pump 52, for example a peristaltic pump, to ensure a continuous flow of strip solution through the module 20. Both of the feed line 46 and the strip line 48 are shown as a closed circuit in FIG. 3, such that the feed solution and the strip solution are in continuous recirculation. However, in other embodiments the feed line and/or the strip line form an open circuit. For example, the strip line can include a first reservoir containing a dilute strip solution and a second reservoir containing a dilute strip solution including a concentration of rare earth elements.

Referring again to FIG. 1, the step of filtering, drying, and annealing the strip solution is depicted as step 18. This step generally includes the recovery of rare earth elements, generally though not necessarily as oxides, from the strip solution, which can be recycled through the membrane assisted solvent extraction module 20. For example, the rare earth elements can be precipitated out with oxalic acid or ammonium hydroxide, followed by filtration, drying at room temperature, and annealing. An optional annealing profile can include 750° C. for two hours. The step of filtering, drying, and annealing the strip solution is optional, however, and can be replaced or modified as desired depending on the intended use of the recovered rare earth elements.

Figure 4:
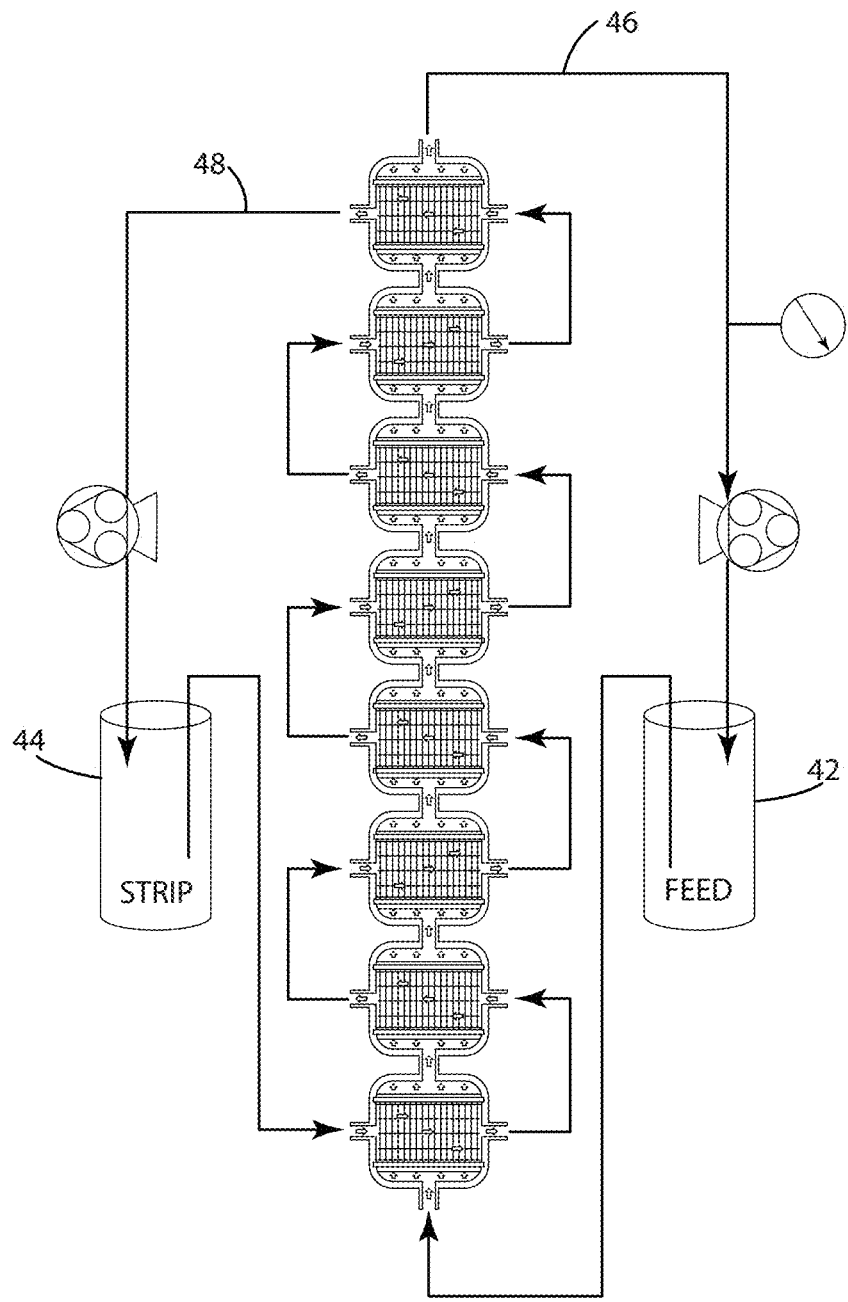
FIG. 4 is an illustrated of the system of FIG. 3 as modified to include eight modules in series.
Figure 5:
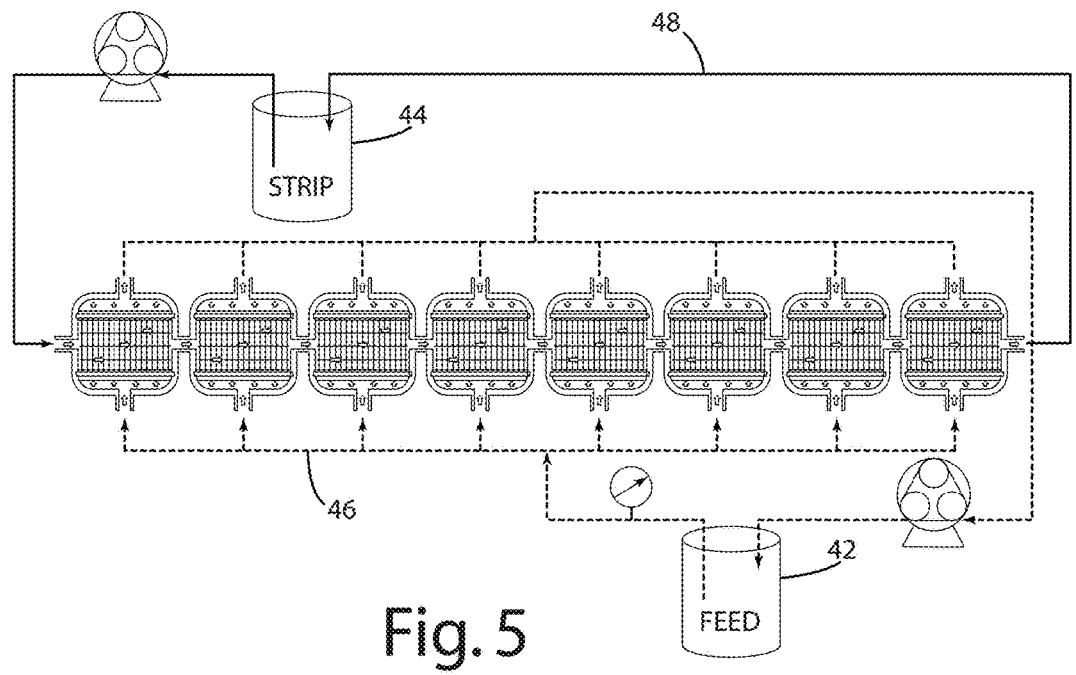
FIG. 5 is an illustrated of the system of FIG. 3 as modified to include eight modules in parallel.

Referring now to FIGS. 4-5, the method and system described above can be modified to include modules 20 that are coupled in series, as shown in FIG. 4, or in parallel, as shown in FIG. 5. When coupled in series, the feed output of one module is in fluid communication with the feed input of the next module. Similarly, the strip output of one module is in fluid communication with the strip input of the next module. When coupled in parallel, the feed input of one module is in fluid communication with the feed input for all other modules. Similarly, the strip output of one module is in fluid communication with the strip output for all other modules.

Figure 6:
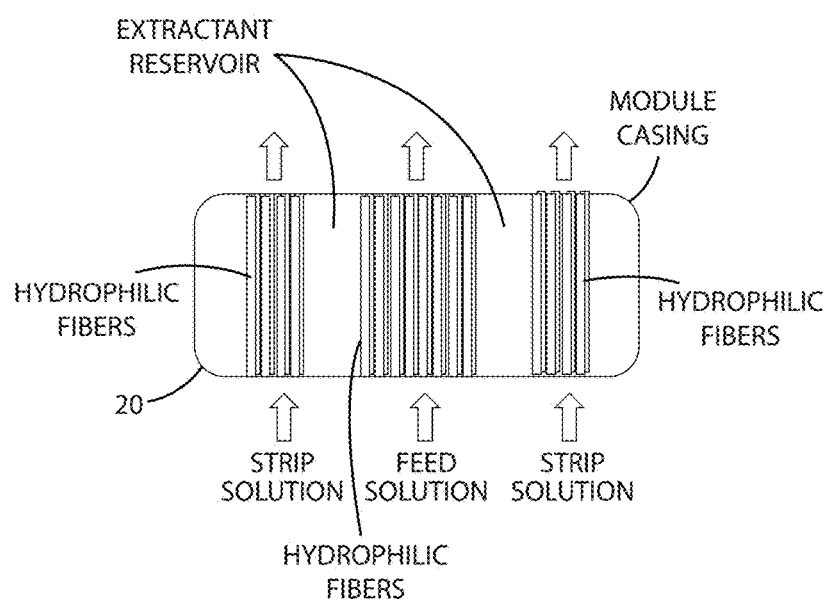
FIG. 6 is an illustration of a solvent extraction module including hydrophobic fibers and hydrophilic fibers.

In accordance with another embodiment, hydrophobic and hydrophilic fibers can be used for extraction and stripping with greater efficiency and process stability. This embodiment is well-suited for larger industrial scale supported liquid membrane extraction systems. As shown in FIG. 6, for example, the membrane assisted solvent extraction module 20 includes two sets of fibers: hydrophobic fibers for extraction and hydrophilic fibers for stripping. The module 20 of FIG. 6 can be used with the method described above in connection with FIG. 1 and the system described above in connection with FIGS. 3-5. The hydrophobic fibers and the hydrophilic fibers are optionally oriented in a common direction, with the hydrophilic fibers being disposed radially outward of (and optionally surrounding) the hydrophobic fibers. Alternatively, the hydrophobic fibers can be disposed radially outward of (and optionally surrounding) the hydrophilic fibers. Still further optionally, the hydrophobic and hydrophilic fibers can be oriented transverse to each other. The feed solution is directed through longitudinal channels defined by the hydrophilic fibers, and the strip solution is directed through longitudinal channels defined by the hydrophobic fibers. The module casing includes a volume of extractant and organic solvent therein, which provides a reservoir of extractant to compensate for losses over time due to solubility. In addition, the strip solution is dispersed in an organic phase which virtually eliminates the loss of extractant and/or solvent, which might otherwise impact the stability of the recovery process. Although remarkably high operational stability with an insignificant drop in extraction efficiency is conceivable for at least 100 hours at noted in the below examples, industrial systems can sometimes require operational stability for >10,000 hours. It is therefore desirable to minimize and/or eliminate extractant losses in some embodiments which is made possible with the embodiment of FIG. 6.

To reiterate, the method of the current embodiment includes the simultaneous extraction and stripping of rare earth elements as part of a continuous and scalable recovery process. The method can overcome removal limitations caused by equilibrium effects and can recover rare earth elements in a highly pure form, potentially obviating the need for further purification and processing. Example rare earth elements include: Nd, Dy, and Pr from automobiles, mobile phones, hard disk drives, computers, consumer electronic devices, industrial electric motors, and hybrid electric vehicles; Eu, Tb, Y from fluorescent lamps, LEDs, LCD backlights, plasma screens, and cathode-ray tubes; and La, Ce, Nd, and Pr from rechargeable batteries and in hybrid electric batteries.

EXAMPLE 1

Rare earth elements were recovered from commercial NdFeB magnets according to the following example, which is intended to be non-limiting.

An aqueous feed solution was prepared by dissolving NdFeB permanent magnets (K&J Magnetics, Grade D42) in 6 M nitric acid for 24 hours. The feed solution was thoroughly mixed to maintain a uniform concentration. Eight hydrophobic polypropylene membrane modules (MICRO-MODULE® by Membrana GmbH) were run in parallel with the following properties: 100 $cm^2$ area, 0.25 mm inner diameter, 700 hollow fibers. The pores of the hollow fibers were impregnated with an organic phase consisting of TODGA, ISOPAR™L (synthetic isoparaffinic solvent), and tributyl phosphate in the ratio of 3:4:3, respectively. The lumen side of the hollow fibers contacted the aqueous feed solution, and the strip side of the hollow fibers contacted the strip solution, which consisted of 0.2 M nitric acid. The feed solution and the strip solution were simultaneously circulated with peristaltic pumps for 55 hours. The feed side was maintained at 15 psig and the strip side was maintained at atmospheric pressure. The strip solution was subsequently precipitated with oxalic acid, filtered, dried, and annealed. The element concentration for Nd, Pr, Fe, B, and Dy in the feed solution is shown in FIG. 7. The element concentration for Nd, Pr, Fe, B, and Dy in the strip solution in FIG. 8. It can be seen from FIG. 8 that Nd, Dy and Pr were selectively recovered with no co-extraction of non-rare earth elements such as Fe and B. This high selectivity of rare earth elements over non-rare earth elements can be attributed to the non-equilibrium separation process of membrane assisted solvent extraction. In this case, rare earth elements are continuously extracted at high driving forces without approaching equilibrium where co-extraction can occur.

EXAMPLE 2

Rare earth elements were recovered from industrial scrap magnets according to the following example, which is intended to be non-limiting.

An aqueous feed solution was prepared by dissolving end-of-life scrap magnets, which contained about 30% by weight of rare earth elements, in 6 M nitric acid. The elemental concentration of the scrap magnet sample is shown in Table 1 below.

| | (wt %) | | | | | | |
|---|---|---|---|---|---|---|---|
| | Fe | Nd | Pr | Dy | B | Co | Ga |
| Magnet | 70 | 23 | 7 | 0 | 0 | 0 | 0 |

Figure 10:
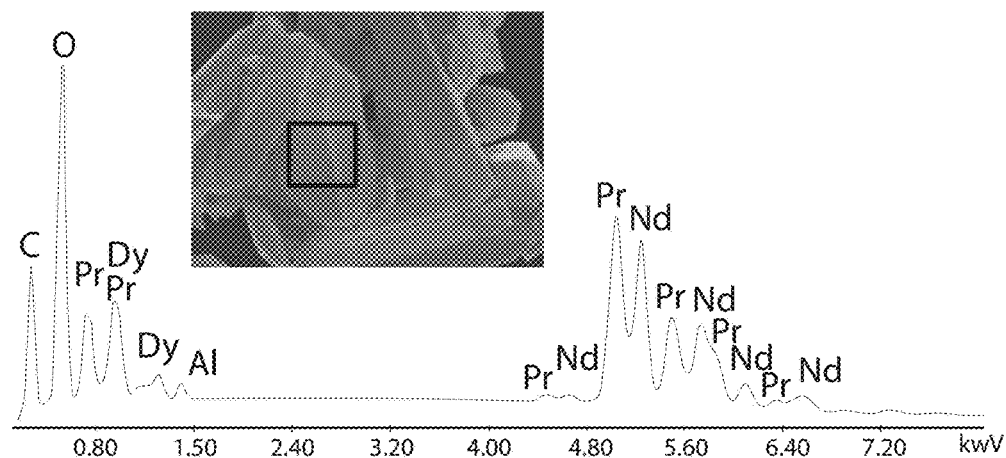
FIG. 10 is a Scanning Electron Microscopy-Energy Dispersion X-ray (SEM-EDX) analysis of rare earth elements recovered form scrap magnets in accordance with the second example.

The feed solution was thoroughly mixed to maintain a uniform concentration. Eight hydrophobic polypropylene membrane modules (MICROMODULE® by Membrana GmbH) were run in parallel with the following properties: 100 cm² area, 0.25 mm inner diameter, 700 hollow fibers. The pores of the hollow fibers were impregnated with an organic phase consisting of TODGA, ISOPAR™ L (synthetic isoparaffinic solvent), and tributyl phosphate in the ratio of 3:4:3, respectively. The lumen side of the hollow fibers contacted the aqueous feed solution, and the strip side of the hollow fibers contacted the strip solution, which consisted of 0.2 M nitric acid. The feed flow rate was 35 cc/min. The strip solution was subsequently precipitated with oxalic acid, filtered, dried, and annealed at 750° C. for 2 hours. The XRD patterns of the resulting rare earth element oxides are shown in FIG. 9. The majority of the peaks shown in the XRD analysis correspond to the peaks for rare earth element oxides such as $Nd_2O_3$ and $Pr_2O_3$, indicating that REE oxides were successfully recovered from industrial scrap magnets. The purity of recovered rare earth elements was examined by SEM-EDX analysis, as shown in FIG. 10. There was no indication of the presence of iron in the recovered rare earth element oxides based on the SEM-EDX analysis.

EXAMPLE 3

Rare earth elements were recovered from industrial scrap magnets according to the following example, which is intended to be non-limiting.

An aqueous feed solution was prepared by dissolving end-of-life scrap magnets, which contained about 31% by weight of rare earth elements, in 6 M nitric acid. The elemental concentration of the scrap magnet sample is shown in Table 2 below.

| | (wt %) | | | | | | |
|---|---|---|---|---|---|---|---|
| | Fe | Nd | Pr | Dy | B | Co | Ga |
| Magnet | 64 | 24.5 | 3.7 | 2.7 | 0.9 | 3.5 | 0.6 |

Figure 11:
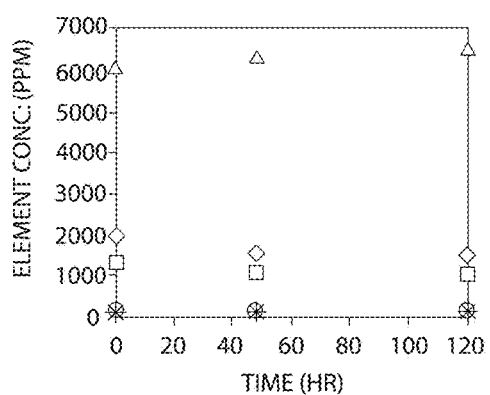
FIG. 11 is a graph illustrating the concentration of elements in the feed solution over time in accordance with a third example.
Figure 12:
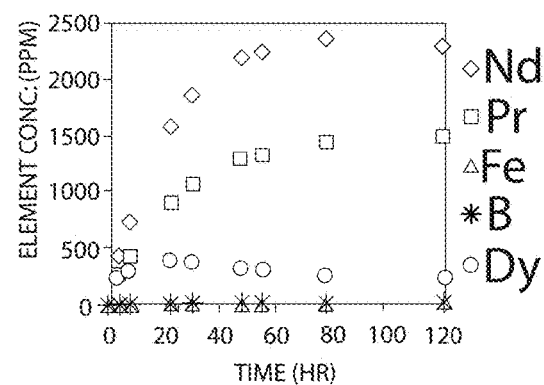
FIG. 12 is a graph illustrating the concentration of elements in the strip solution over time in accordance with the third example.
Figure 13:
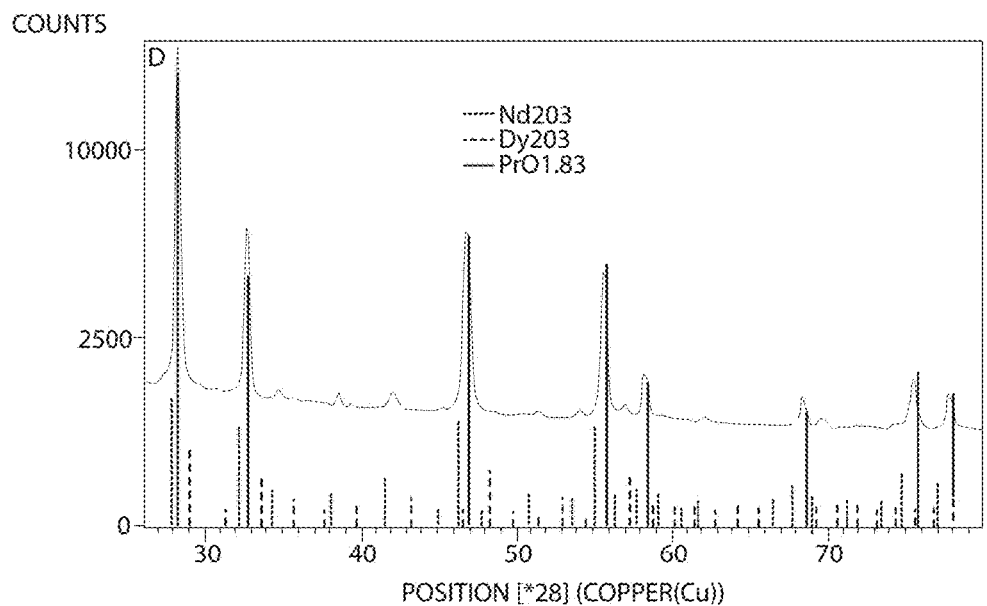
FIG. 13 is an XRD analysis of rare earth element oxides from scrap magnets in accordance with the third example.
Figure 14:
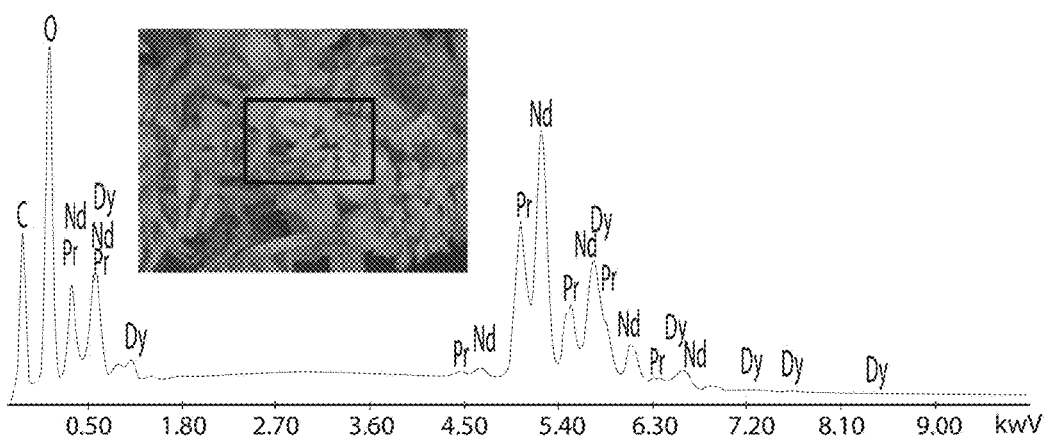
FIG. 14 is an SEM-EDX analysis of rare earth elements recovered form scrap magnets in accordance with the third example.

The feed solution was thoroughly mixed to maintain a uniform concentration. Eight hydrophobic polypropylene membrane modules (MICROMODULE® by Membrana GmbH) were run in parallel with the following properties: 100 cm² area, 0.25 mm inner diameter, 700 hollow fibers. The pores of the hollow fibers were impregnated with an organic phase consisting of TODGA, ISOPAR™ L (synthetic isoparaffinic solvent), and tributyl phosphate in the ratio of 3:4:3, respectively. The lumen side of the hollow fibers contacted the aqueous feed solution, and the strip side of the hollow fibers contacted the strip solution, which consisted of 0.2 M nitric acid. The feed flow rate was 35 ccm. The rare earth element extraction results are shown in FIGS. 11-12, which illustrates the elemental concentration of scrap magnets in the feed solution (FIG. 11) and the strip solution (FIG. 12). As shown in FIG. 12, there was no co-extraction of non-rare earth elements in strip solution over the 120 hour run. The strip solution was subsequently precipitated with oxalic acid, filtered, dried, and annealed at 750° C. for 2 hours. The XRD patterns of the resulting rare earth element oxides are shown in FIG. 13 and their SEM-EDX analysis are presented in FIG. 14. The XRD patterns and SEM-EDX analysis demonstrated that nearly pure rare earth elements were successfully recovered from scrap magnets having the composition shown above.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for the recovery of rare earth elements, the method comprising:
   providing a plurality of hollow fibers including a lumen side spaced apart from a shell side to define a membrane therebetween, the membrane including a plurality of pores dispersed therein;
   wetting the plurality of pores of the membrane for each of the plurality of hollow fibers by impregnating the plurality of pores with an immobilized organic phase;
   directing a continuous flow of an aqueous feed solution including a rare earth element along one of the lumen side or the shell side of the plurality of hollow fibers, wherein impregnating the plurality of pores is performed prior to the step of directing a continuous flow of an aqueous feed solution; and
   directing a continuous flow of a strip solution along the other of the lumen side or the shell side of the plurality of hollow fibers;
   wherein the organic phase includes an extractant, isoparaffin, and an organic solvent, and wherein rare earth elements are extracted from the feed solution and stripped from the organic phase in a continuous process, such that the concentration of the rare earth elements in the organic phase decreases across a thickness of the hollow fibers.

2. The method according to claim 1 further including adding an extractant to the feed solution to maintain a desired concentration of the extractant in the organic phase.

3. The method according to claim 1 wherein the extractant is tetraoctyl diglycol amide, trialkyl phosphine oxide, 2-ethylhexyl phosphonic acid mono-2-ethylhexyl ester, carbamoyl phosphoryl oxides, or sec-octylphenoxy acetic acid.

4. The method according to claim 1 wherein the organic solvent includes tributyl phosphate, xylene, hexane, octanol, or kerosene.

5. The method according to claim 1 wherein the organic phase includes tetraoctyl diglycol amide and tributyl phosphate.

6. The method according to claim 1 wherein the plurality of hollow fibers are formed from a hydrophobic material.

7. The method according to claim 1 wherein the feed solution includes a pressure differential with respect to the strip solution.

8. The method according to claim 1 wherein the plurality of hollow fibers define a mean inner diameter of between 0.1 mm and 1.0 mm inclusive.

9. The method according to claim 1 wherein the plurality of hollow fibers define a mean outer diameter of between 0.1 mm and 1.0 mm inclusive.

10. The method according to claim 1 wherein the plurality of hollow fibers define a mean pore size of the plurality of pores of less than 0.1 microns.

11. The method according to claim 1 wherein the feed solution includes a higher molar concentration of an acid than the strip solution to define a chemical potential gradient between the feed solution and the strip solution.

* * * * *